US008851425B2

(12) United States Patent
Ferrendier et al.

(10) Patent No.: US 8,851,425 B2
(45) Date of Patent: Oct. 7, 2014

(54) REMOVABLE SUPPORT FOR OPTIONAL EXTERNAL EQUIPMENT ON AN AIRCRAFT, AND AN AIRCRAFT PROVIDED WITH SUCH A SUPPORT

(75) Inventors: Sophie Ferrendier, Bouc Bel Air (FR); Patrice Guerard, Ventabren (FR); Ludovic Somson, La Roque d'Antheron (FR); Patrice Godiot, Velaux (FR); David Figoureux, Salon de Provence (FR)

(73) Assignee: Airbus Helicopters, Marignane Cedex (FR)

( * ) Notice: Subject to any disclaimer, the term of this patent is extended or adjusted under 35 U.S.C. 154(b) by 345 days.

(21) Appl. No.: 13/014,122

(22) Filed: Jan. 26, 2011

(65) Prior Publication Data

US 2011/0186686 A1    Aug. 4, 2011

(30) Foreign Application Priority Data

Jan. 29, 2010    (FR) ..................... 10 00361

(51) Int. Cl.
*B64D 1/12* (2006.01)
*B64C 1/22* (2006.01)
*B64C 27/04* (2006.01)

(52) U.S. Cl.
CPC .. *B64C 1/22* (2013.01); *B64C 27/04* (2013.01)
USPC .................. 244/137.4; 244/129.1; 244/137.1; 244/118.1; 244/118.5

(58) Field of Classification Search
USPC .......... 244/129.1, 137.1, 137.4, 118.1, 118.5; 248/220.21, 73, 637, 649, 122.1, 248/205.1; 211/200, 99, 201, 169, 171
See application file for complete search history.

(56) References Cited

U.S. PATENT DOCUMENTS

| 2,953,330 | A |   | 9/1960  | Lysak |
|-----------|---|---|---------|-------|
| 3,478,904 | A | * | 11/1969 | Courter ...................... 244/137.1 |
| 3,604,660 | A | * | 9/1971  | Marley ....................... 244/17.11 |
| 3,764,105 | A |   | 10/1973 | Ducuing |
| 3,942,749 | A | * | 3/1976  | Hasquenoph et al. ...... 244/137.4 |
| 4,174,162 | A | * | 11/1979 | Giacomini et al. ............. 396/12 |
| 4,566,659 | A |   | 1/1986  | Luckachina |
| 4,752,791 | A | * | 6/1988  | Allred ............................. 396/13 |
| 5,093,677 | A | * | 3/1992  | McMahon ...................... 396/13 |
| 5,133,517 | A | * | 7/1992  | Ware .......................... 244/171.1 |
| 5,365,291 | A | * | 11/1994 | Maeda ............................ 396/12 |

(Continued)

FOREIGN PATENT DOCUMENTS

GB    2157647 A  * 10/1985 ............. B65D 19/44

*Primary Examiner* — Isam Alsomiri
*Assistant Examiner* — Assres H Woldemaryam
(74) *Attorney, Agent, or Firm* — Brooks Kushman P.C.

(57) ABSTRACT

The present invention relates to a removable support (10) for optional equipment (6) on an aircraft (1). The support (10) comprises an elongate beam (20) fitted with at least one attachment point for a piece of equipment and extending from a first end portion (21) to a second end portion (22), and the support (10) is provided with first fastener means (30) provided with a first fastener arm (31) connected to a first link arm (32) that is releasably fastened to the first end portion (21), and with second fastener means (40) provided with a second fastener arm (41) connected to a second link arm (42) that is releasably fastened to the second end portion (22), a first support rod (34) also connecting the first fastener arm (31) to the first link arm (32), and a second support rod (44) also connecting the second fastener arm (41) to the second link arm (42).

19 Claims, 4 Drawing Sheets

(56) References Cited

U.S. PATENT DOCUMENTS

| | | | |
|---|---|---|---|
| 5,540,402 A | 7/1996 | Carducci | |
| 5,710,945 A * | 1/1998 | Thompson | 396/13 |
| 6,126,113 A | 10/2000 | Navickas | |
| 6,176,167 B1 * | 1/2001 | Sanderson | 89/1.54 |
| 6,488,236 B2 | 12/2002 | Landry | |
| 7,503,525 B1 * | 3/2009 | Lam et al. | 244/137.4 |
| 7,806,368 B1 * | 10/2010 | Smith et al. | 244/129.5 |
| 2007/0145213 A1 * | 6/2007 | Fischer | 248/205.1 |
| 2009/0084901 A1 * | 4/2009 | Lam et al. | 244/137.4 |
| 2009/0302180 A1 * | 12/2009 | Dantuono | 248/205.1 |

* cited by examiner

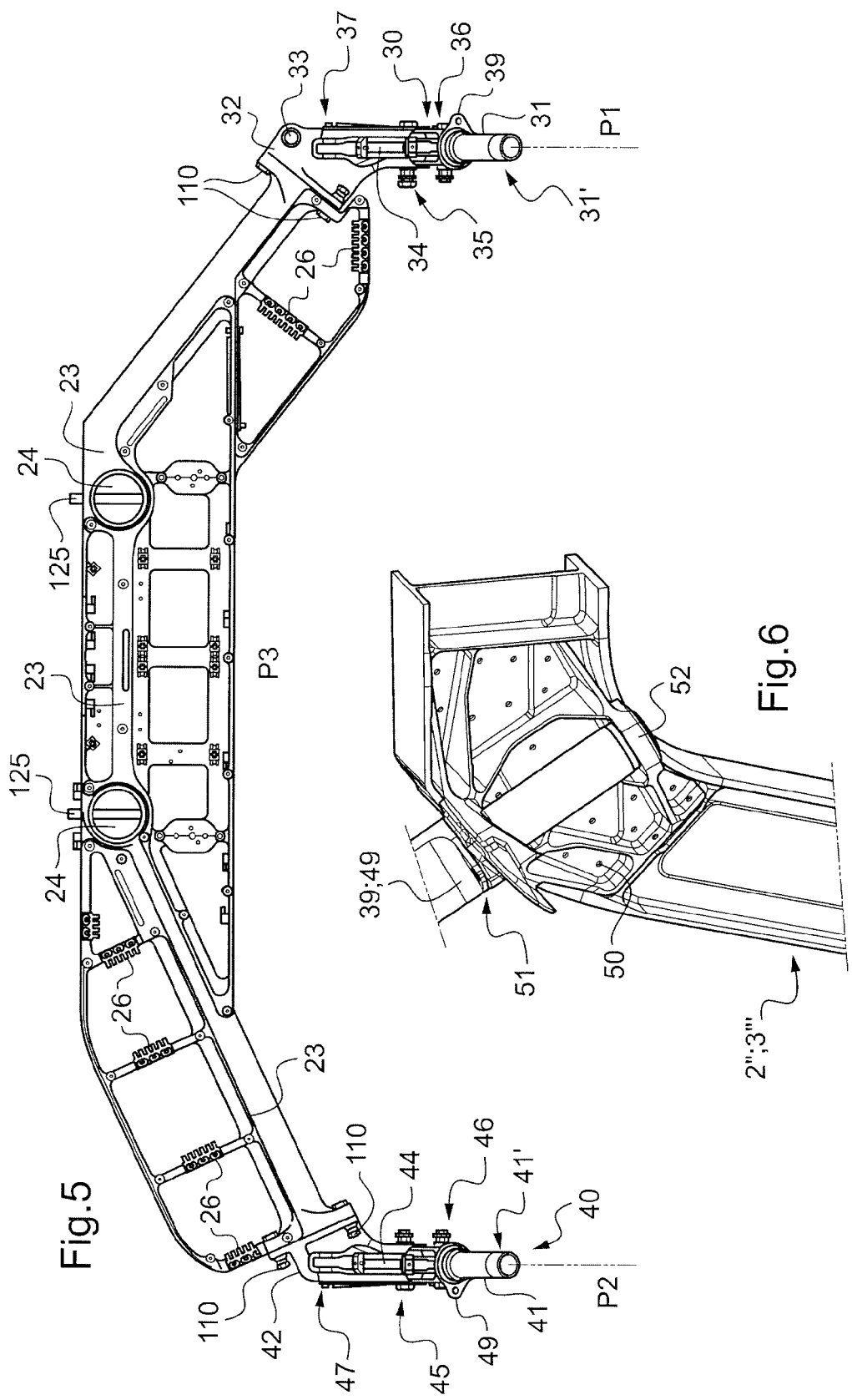

REMOVABLE SUPPORT FOR OPTIONAL EXTERNAL EQUIPMENT ON AN AIRCRAFT, AND AN AIRCRAFT PROVIDED WITH SUCH A SUPPORT

CROSS REFERENCE TO RELATED APPLICATIONS

This application claims the benefit of FR 10 00361 filed on Jan. 29, 2010, the disclosure of which is incorporated in its entirety by reference herein.

FIELD OF THE INVENTION

The present invention relates to a removable support for supporting optional external equipment on an aircraft, and it also relates to an aircraft provided with such a support.

More particularly, the invention relates to a support of the winch support type that is arranged on a rotorcraft, e.g. a helicopter. Nevertheless, the support is also suitable for carrying any type of removable equipment, a camera, a search light, or indeed a loudspeaker, in particular.

BACKGROUND OF THE INVENTION

A rotorcraft may include a removable equipment support that is suitable for carrying a winch, for example.

A first type of equipment support comprises a support arm fastened at a single point to a structure of the aircraft. The single point is designed to take up forces, and may be referred to as a "take-up" point. That first type of support also includes supports provided with a support arm that is fastened to a single zone of the structure by a plate.

The support arm may optionally be hinged to make it easier to maneuver the equipment being carried.

Although equipment supports of the first type, i.e. supports that are fastened to a single take-up point, are attractive, they present the drawback of being capable of supporting only relatively small forces.

The take-up point of the arm on the structure must necessarily be situated on a load-carrying structure of the aircraft. Such a load-carrying structure is generally a carrier frame contained in an elevation plane of the aircraft and located beside an opening in the fuselage of the aircraft, through which opening an operator may handle the supported equipment, for example.

Under such circumstances, the support arm of the equipment support extends over a considerable distance in order to reach the take-up point. As a result, there is a considerable lever arm that limits the load that the equipment support is capable of supporting.

Furthermore, the carrier frame needs to be strongly reinforced at the take-up point for the support arm.

Document U.S. Pat. No. 4,566,659 presents a support of the first type that is hinged so as to be capable of being moved in an elevation plane of the aircraft.

It is possible to envisage using a support of a second type that is fastened to two take-up points of the structure of the aircraft. Nevertheless, a support that is fastened at two points does not appear to be capable of supporting relatively large forces. In addition, the structure of an aircraft is subjected to aerodynamic forces in flight that tend to deform it. Any such deformation of the structure would appear to be incompatible with a support that is fastened to two take-up points.

Thus, the state of the art presents in contrast an equipment support of a third type that is fastened to the structure not via two take-up points but rather via three, mainly two take-up points in a top portion above a lateral opening in the fuselage and one take-up point in a bottom portion situated beneath said opening or on a carrier frame of the load-carrying structure of the aircraft.

Document U.S. Pat. No. 6,488,236 presents a support of the third type having an arm connected to a fastener shaft, a bottom portion of the shaft being secured at a first take-up point to a floor while a top portion of the shaft is secured at a second take-up point to a ceiling. Furthermore, the support is provided with a rod that is fastened to a third take-up point.

That architecture using three take-up points is advantageous in that it enables heavy loads to be supported. Nevertheless, it will be understood that it is bulky and heavy, which is penalizing in an aviation application.

Document GB 2 157 647 describes a device having a horizontal plate that co-operates with a vertical plate for carrying loads.

Document U.S. Pat. No. 3,764,105 is remote from the invention in that it presents a device for enabling an aircraft wheel to be changed.

Document U.S. Pat. No. 6,126,113 shows a helicopter provided with a honeycomb structure.

Document U.S. Pat. No. 5,540,402 presents a beam carrying a net.

Document U.S. Pat. No. 2,953,330 presents a rectangular box structure suspended from an aircraft.

SUMMARY OF THE INVENTION

An object of the present invention is thus to provide a support of the second type for supporting optional equipment external to an aircraft and enabling heavy loads to be carried, the support not occupying a large amount of space and not giving rise to any great increase in the weight of the aircraft.

According to the invention, a removable support for optional equipment on an aircraft is remarkable in that it comprises an elongate beam fitted with at least one attachment point for a piece of equipment and extending from a first end portion to a second end portion. In addition, said support is provided both with first fastener means provided with a first fastener arm connected to a first link arm that is releasably fastened to said first end portion of the beam, and also with second fastener means provided with a second fastener arm connected to a second link arm that is releasably fastened to said second end portion. In addition, a first support rod of the first fastener means connects the first fastener arm to the first link arm, and a second support rod of the second fastener means connects the second fastener arm to the second link arm.

Each of the fastener arms may then be fastened to a carrier frame of an aircraft. Consequently, the support is a support that is releasably fastened at two take-up points of a structure of an aircraft, for example.

In addition, each fastener means presents a structure that is triangular as conferred by its fastener arm, its link arm, and its support rod. Under such circumstances, the support is a support having two take-up points and is suitable for carrying heavy loads without requiring a third take-up point to be used.

The support may also include one or more of the following characteristics.

For example, at least one of the fastener means includes additional attachment means. For example, the support may include attachment means, such as a shackle ring, located equally well on the first fastener means and/or on the second fastener means. Such additional attachment means may be used for attaching a camera or any other equipment, such as a cord, for example.

In another aspect, the fastener arm of a fastener means is hinged to the link arm of said fastener means. Optionally, each fastener means may possess a main ball joint between its fastener arm and its link arm.

The hinge of each fastener means between its fastener and link arms gives the support good ability to accommodate static and dynamic deformation of the structure.

In addition, the hinge serves to compensate for any manufacturing drift. Depending on the tolerances for manufacturing carrier frames that receive the first and second fastener means, it may be difficult to mount the support on the aircraft. The hinge in each fastener means between its fastener and link arms thus provides an operator with freedom of movement and facilitates installing the support in non-negligible manner.

In a variant, the fastener arm of a fastener means is hinged to the link arm of the fastener means by an assembly hinge having a bushing passing through a spherical element along an assembly axis, the assembly hinge accommodating movement over a given maximum distance of the fastener arm relative to the link arm along the assembly axis.

Similarly, at least one support rod of a fastener means is hinged firstly to the fastener arm and secondly to the link arm of said fastener means.

In addition, with each fastener means being provided with a fastener arm and a link arm, at least one fastener means includes a support rod that is hinged firstly to the fastener arm and secondly to the link arm.

According to an aspect of the invention, the fastener arm extends from a first distal end to a first proximal end, the link arm of the fastener means includes a second proximal end hinged to the first proximal end, and a second distal end releasably fastened to the beam, and the support rod of the fastener means is hinged firstly to the fastener arm between the first distal end and the first proximal end, and secondly to the link arm between the second proximal end and the second distal end that is releasably fastened to the beam.

It should be observed that the terms "proximal" and "distal" are used for the link arm with reference to the fastener arm. Similarly, the terms "proximal" and "distal" are used for the fastener arm with reference to the link arm.

At least one support rod may also extend over a distance that is adjustable, thus making it possible in particular to adjust the position of the link arm relative to the fastener arm, i.e. the angle between the link arm and the fastener arm. Thus, it is possible to adjust accurately the position of the beam supporting the optional equipment.

In addition, adjusting the support rod is also justified from the point of view of installing the support. By adjusting this support rod, an operator can compensate for any manufacturing drift, e.g. relating to the carrier frame.

In a variant, each fastener arm co-operates directly with a carrier frame, e.g. having a fastener peg penetrating directly in a fastener orifice of the carrier frame.

In another variant, the support includes at least one frame reinforcement suitable for being arranged in a carrier frame of a structure, the reinforcement co-operating with a fastener arm of fastener means.

Thus, each reinforcement may include a fastener orifice that co-operates with a fastener peg of a fastener arm.

In addition, at least one fastener means may include a finger inserted in a length member of the beam in order to optimize fastening of the beam to the fastener means.

Furthermore, the beam optionally includes at least one hole suitable for receiving a support ring for supporting said optional equipment. The optional equipment is then engaged in the beam. A fastener shaft may pass through the hole.

In addition, the support may include a support ring that co-operates with said hole and the equipment to be carried so as to enhance retention of said equipment, each support ring being arranged in the hole between the beam and the equipment.

In another aspect, the beam includes at least one length member that defines the hole, the length member being releasably fastened to fastener means. More precisely, the hole is formed in the body of the length member, the length member co-operating with the fastener means. The supported optional equipment is then connected to a carrier frame by elements that are strong, namely the length member and the fastener means.

It can be understood that the beam may be a one-piece member that is machined in its bulk, with the length member being the result of such machining. In a variant, the beam may possess a plurality of members that co-operate with one another, such as a length member and ribs disposed between a top covering and a bottom covering.

Finally, the beam is hollow, at least in part, so as to be capable of containing within it electrical cabling suitable for being connected to the optional equipment.

In addition to an equipment support, the invention provides an aircraft, in particular a rotorcraft provided with a removable equipment support.

Thus, according to the invention, an aircraft is provided with first and second carrier frames of a fuselage, each carrier frame being contained in an elevation plane of the aircraft, a first elevation upright of the first carrier frame and a second elevation upright of the second carrier frame being placed on either side of an opening in said fuselage leading to a medium outside the aircraft, the first elevation upright extending from a first bottom portion situated at a bottom of said opening to a first top portion situated at a top of said opening, the second elevation upright extending from a second bottom portion situated at the bottom of said opening to a second top portion situated at the top of said opening.

The aircraft then includes a removable support for optional equipment in accordance with the above-described invention, said support comprising a beam fitted with at least one attachment point for a piece of equipment and extending from a first end portion to a second end portion, said support being provided with first fastener means provided with a first fastener arm connected to a first link arm that is releasably fastened to said first end portion, and with second fastener means provided with a second fastener arm connected to a second link arm that is releasably fastened to said second end portion, a first support rod also connecting the first fastener arm to the first link arm and a second support rod also connecting the second fastener arm to the second link arm, the first fastener arm being releasably fastened to the first top portion, and the second fastener arm being fastened to the second top portion so that the beam extends in register with said top of the opening.

BRIEF DESCRIPTION OF THE DRAWINGS

The invention and its advantages appear in greater detail from the following description of embodiments given by way of illustration with reference to the accompanying figures, in which:

FIG. 5 is a section view of a beam; and

FIG. 6 is a view of frame reinforcement.

Elements that are shown in more than one of the figures are given the same references in each of them.

DETAILED DESCRIPTION OF THE PREFERRED EMBODIMENT

Figure 1:
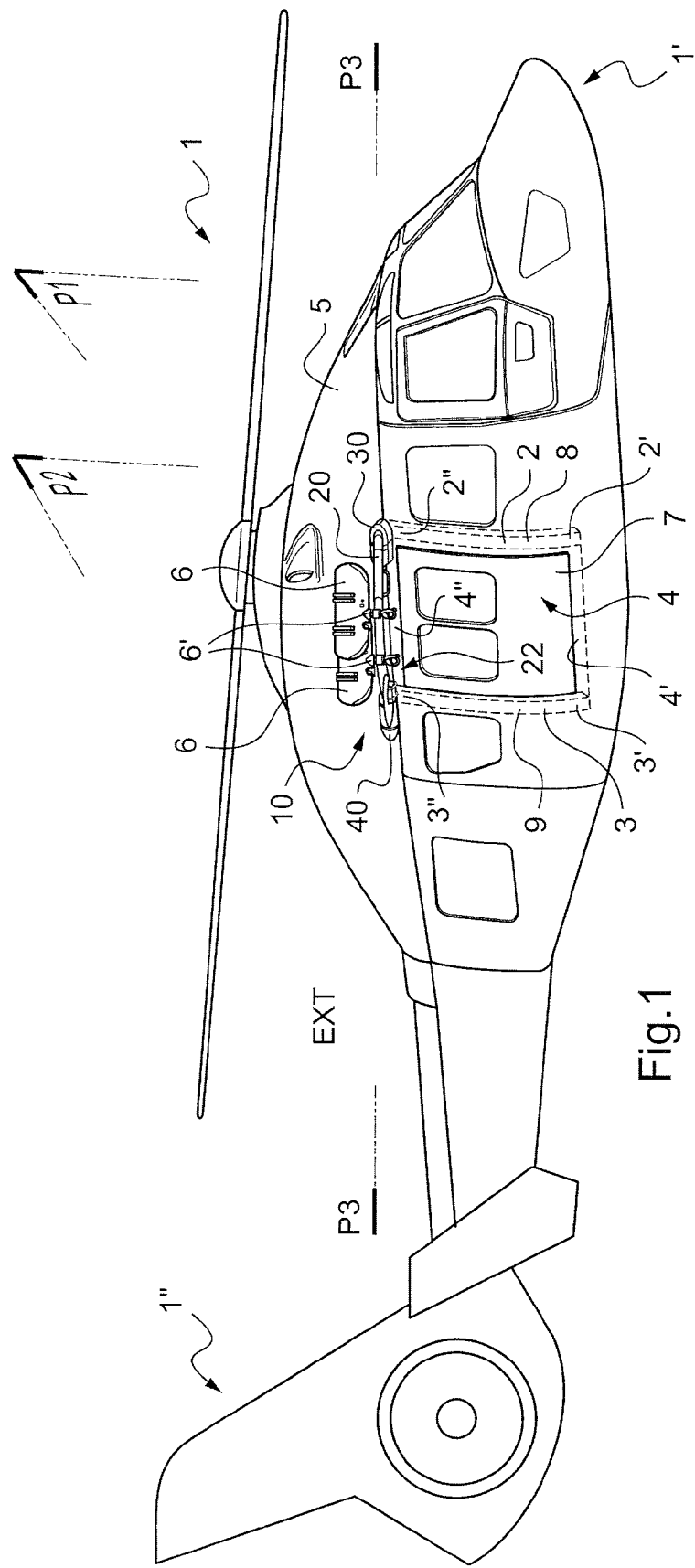
FIG. 1 shows an aircraft of the invention.

FIG. 1 shows an aircraft 1, specifically a helicopter, extending from a nose 1' to a tail 1". The aircraft includes a fuselage 5 carried in particular by a first carrier frame 2 and a second carrier frame 3.

These first and second carrier frames 2 and 3 are shown in dashed lines in FIG. 1 insofar as they are located inside the fuselage 5.

The fuselage 5 includes an opening 4 leading to an external medium EXT outside the aircraft in order to enable passengers to penetrate into a cabin or to enable an operator to perform a winching operation in flight, for example. This opening 4 may be closed by a sliding door 7. Furthermore, it can be seen that a first elevation upright 8 of the first carrier frame 2 and a second elevation upright 9 of the second carrier frame 3 are arranged on either side of the opening 4.

Under such circumstances, the first elevation upright 8 extends up from a first bottom portion 2' situated level with the base 4' of the opening 4 towards a first portion 2" situated level with the top 4" of the opening 4. The first elevation upright 8 and the associated first carrier frame 2 are then contained in a first elevation plane P1 defining the opening 4 and located upstream from said opening 4 in a direction going from the nose 1' towards the tail 1".

Similarly, the second elevation upright 9 extends from a second bottom portion 3' situated level with the base 4' of the opening 4 towards a second top portion 3" situated level with the top 4" of the opening 4. The second elevation upright 9 and the associated second carrier frame 3 are then contained in a second elevation plane P2 defining the opening 4, being located downstream from said opening 4 in a direction going from the nose 1' towards the tail 1".

The first and second bottom portions 2' and 3' then rest on a floor referred to as the "cabin floor" while the first and second top portions 2" and 3" are connected together by a ceiling referred to as the "engine floor" by the person skilled in the art.

The aircraft 1 shown diagrammatically is fitted with a removable support 10 suitable for carrying equipment 6 of the winch type, for example.

The support 10 comprises an elongate beam 20 carrying the equipment 6, one support ring per piece of equipment co-operating with a hole in the beam 20.

In addition, a first extreme zone 21 of the beam 20 is releasably fastened to the first top portion 2" of the first elevation upright 8 by first fastener means 30, while the second extreme zone 22 of the beam 20 is releasably fastened to the second top portion 3" of the second elevation upright 9 by second fastener means 40.

Thus, the beam 20 is arranged in a support plane P3 perpendicular to the first elevation plane P1 and to the second elevation plane P2 and it projects from the fuselage 5 towards the outside of the aircraft 1. In addition, the beam 20 overlies the opening 4, extending from one side to the other of the opening 4 in register with its top 4".

Figure 2:
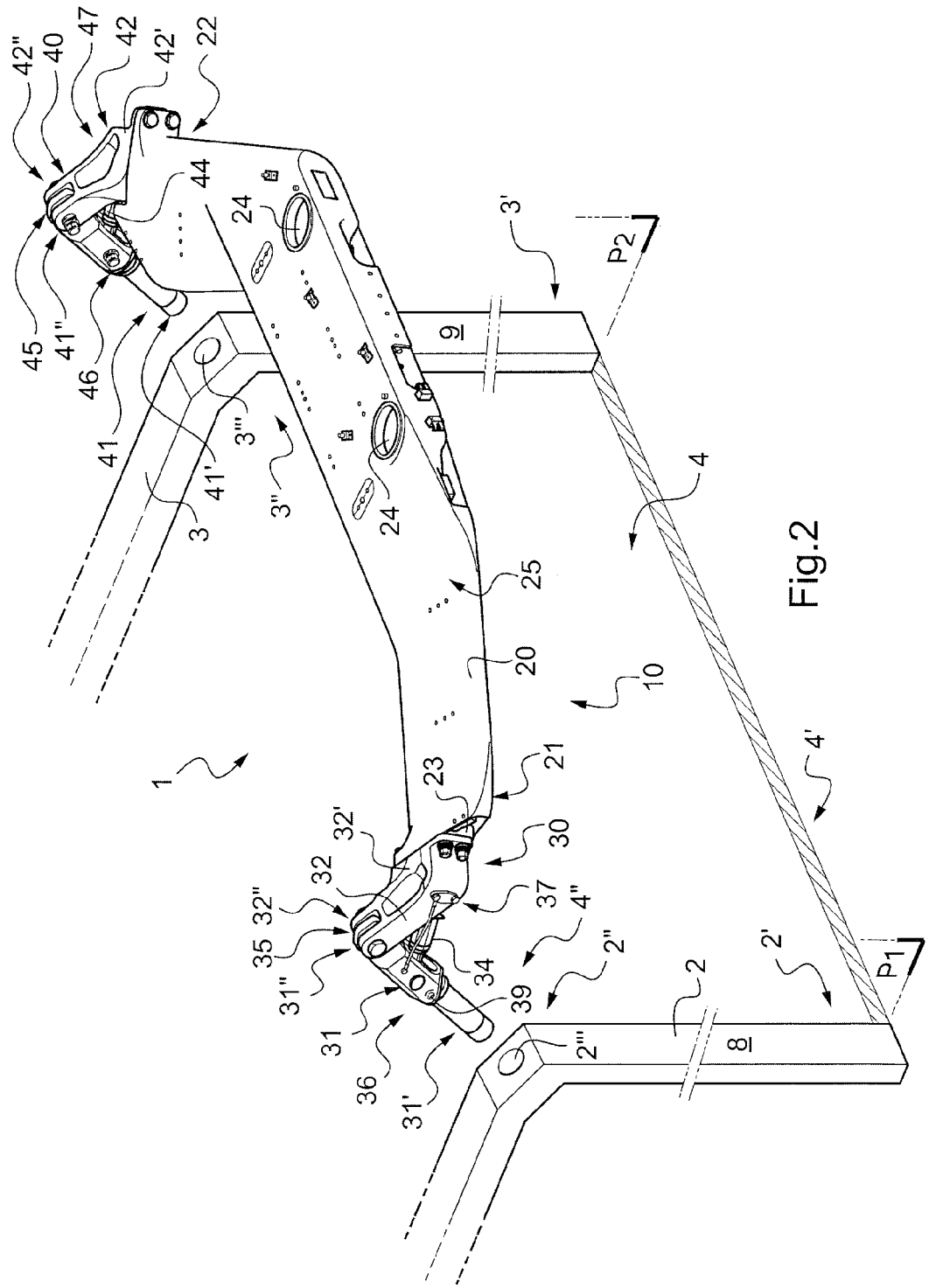
FIG. 2 is a diagram showing a support of the invention in perspective.

FIG. 2 shows the support 10 in perspective.

The support 10 comprises a beam 20 provided with at least one length member 23 and a covering 25 containing the length member 23. In addition, the beam is provided with two holes 24, each suitable for receiving a support ring 6' for a piece of equipment 6 that is to be carried. The length member 23 may comprise one or more branches.

It should be observed that the beam may be a single piece i.e. a single block, with the covering and the length member being constituted by a single machined solid. In another variant, the beam comprises an assembly of a plurality of members.

Furthermore, the beam 20 extends from a first end portion 21 towards a second end portion 22. The support 10 then has first fastener means 30 suitable for releasably fastening the first end portion 21 to a first top portion 2" of a first elevation upright 8, and second fastener means 40 suitable for releasably fastening the second end portion 22 to a second top portion 3" of a second elevation upright 9.

Figure 3:
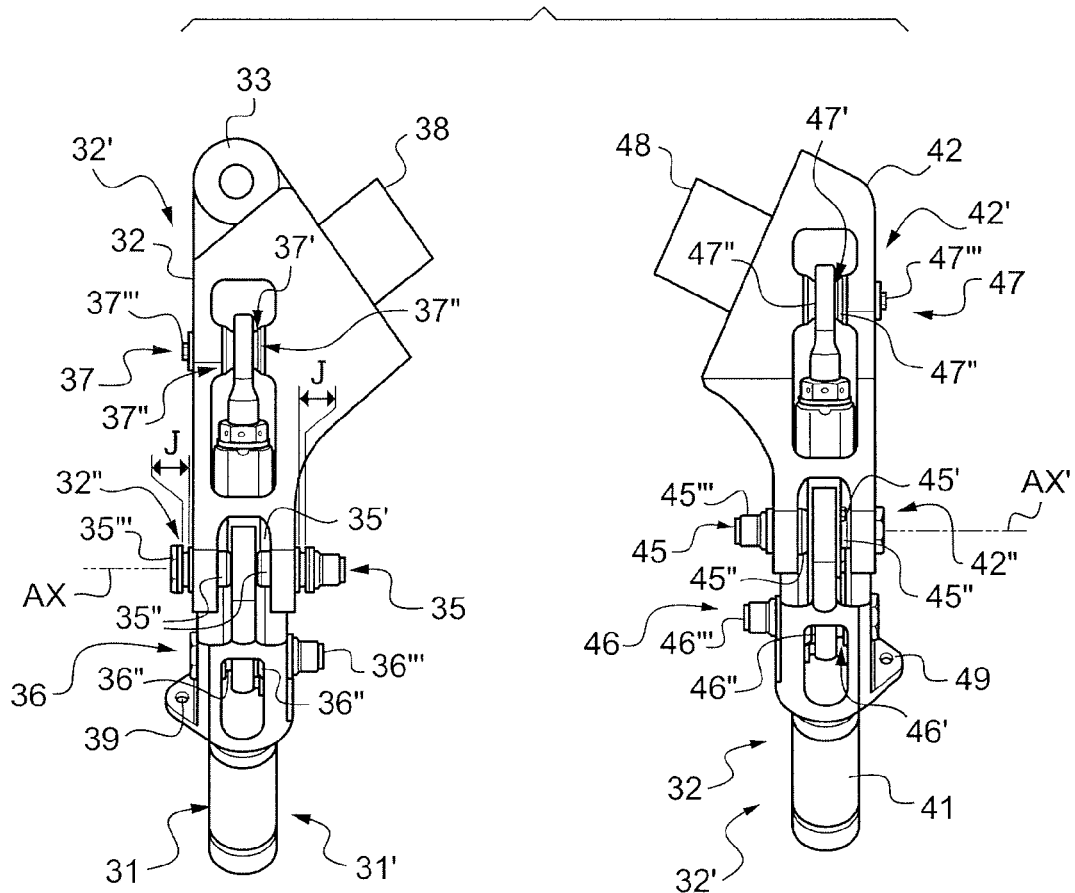
FIG. 3 is a plan view of first and second fastener means.

FIGS. 2 and 3 show the first and second fastener means 30 and 40, these fastener means 30 and 40 being shown in perspective and fastened to the beam 10 in FIG. 2, and in plan view without the beam 10 in FIG. 3.

The first fastener means 30 comprises a first fastener arm 31 connected to a first link arm 32.

The first fastener arm 31 extends from a first distal end 31' towards a first proximal end 31". The first distal end 31' is suitable for co-operating with the first carrier frame 2, directly via a first orifice 2''' in said first carrier frame, into which the first distal end 31' is engaged, or indirectly via frame reinforcement.

Furthermore, the first link arm 32 is contained substantially in the support plane P3 that contains the beam 20. In addition, this first link arm 32 extends from a second proximal end 32" towards a second distal end 32'. Thus, the second proximal end 32" of the first link arm 32 is hinged by a main ball joint to the first proximal end 31", the second distal end 32' being fastened to a length member 23 of the beam 20 via bolts 110 visible in FIG. 5 and a holding finger (not visible in FIG. 2).

The first fastener means is thus releasably fastened to the first end portion 21 of the beam 20.

In addition, the first fastener means 30 includes a first support rod 34 connected by hinges to the first fastener arm 31 and to the first link arm 32. This first support rod serves in particular to position the first fastener arm relative to the first link arm so that the beam 20 is in the required position. In addition, the first support rod 34 imparts a triangular structure to the first fastener means 30, which triangular structure enables the first fastener means to support large forces.

Under such circumstances, a first secondary ball joint 36 of the first fastener means 30 connects the first support rod 34 to the first fastener arm 31, this first secondary ball joint 36 of the first fastener means 30 being located between the first distal end 31' and the first proximal end 31" of the first fastener arm 31 of the first fastener means 30. In addition, a second secondary ball joint 37 of the first fastener means 30 connects the first support rod 34 to the first link arm 32, the second secondary ball joint 37 of the first fastener means 30 being located between the second distal end 32' and the second proximal end 32" of the first link arm 32 of the first fastener means 30.

Similarly, the second fastener means 40 comprises a second fastener arm 41 connected to a second link arm 42.

The second fastener arm 41 extends from a first distal end 41' towards a first proximal end 41". The first distal end 41' of the second fastener arm is suitable for co-operating with the second carrier frame 3, directly via a second orifice 3''' in said second carrier frame into which said first distal end 41' is engaged, or indirectly via frame reinforcement.

Furthermore, the second link arm 42 of the second fastener means 40 is contained substantially in the support plane P3 containing the beam 20 and extending from a second proximal end 42" towards a second distal end 42'. Thus, the second proximal end 42" of the second link arm 42 is hinged by a main ball joint to the first proximal end 41" of the second fastener arm 41, the second distal end 32' being fastened to a length member of the beam 20 by bolts and a holder finger (not visible in FIG. 2). The second fastener means are thus releasably fastened to the second end portion 22 of the beam 20.

In addition, the second fastener means 40 include a second support rod 44 connected by hinges to the second fastener arm 41 and to the second link arm 42, in particular for positioning the second fastener arm relative to the second link arm so that the beam 20 is in the required position. The second support rod 44 thus imparts a triangular structure to the second fastener means 40, this triangular structure enabling the second fastener means 40 to support large forces.

Under such circumstances, a first secondary ball joint 46 of the second fastener means 40 connects the second support rod 44 to the second fastener arm 41, this first secondary ball joint 46 of the second fastener means 40 being located between the first distal end 41' and the first proximal end 41" of the second fastener arm of the second fastener means 40. In addition, a second secondary ball joint 47 of the second fastener means 40 connects the second support rod 44 to the second link arm 42, this second secondary ball joint 47 of the second fastener means 40 being located between the second distal end 42' and the second proximal end 42" of the second link arm 42 of the second fastener means 40.

It can thus be understood that in the preferred embodiment, shown diagrammatically in FIG. 2, each fastener means 30, 40 having a fastener arm 31, 41 extending from a first distal end 31', 41' towards a first proximal end 31", 41" and a link arm 32, 42 including a second proximal end 32", 42" hinged to said first proximal end 31", 41" and a second distal end 32', 42' releasably fastened to said beam 20, a support rod 34, 44 is hinged firstly to the fastener arm 31, 41 between the first distal end 31', 41' and the first proximal end 31", 41" of one of the fastener means and secondly to the link arm 32, 42 between said second proximal end 32", 42" and the second distal end 32', 42' of said fastener means.

With reference to FIG. 3, each main ball joint 35, 45 of an assembly hinge may comprise a spherical element 35', 45' disposed in an outer cage secured to the first proximal end 31", 41" of a fastener arm.

The first spherical element 35' of the first fastener means 30 is clamped between two spacers 35" passing through two cheeks of a fork of the second proximal end 32" of the associated first link arm. The first assembly comprising the spherical element 35' and the associated spacers 35" then has a fastener bushing 35''' passing therethrough along an assembly axis AX.

It should be observed that each spacer 35" has freedom of movement relative to the associated fork, clearance J possibly separating the head of the spacer and the associated fork.

As a result, the first main ball joint 35 can move along the assembly axis AX between the cheeks of the fork of the first link arm 32. In order to facilitate mounting the support on the aircraft, an operator can then move the first link arm 32 relative to the first fastener arm 31 along the assembly axis AX through some given maximum distance, e.g. of the order of one centimeter.

Conversely, the second spherical element 45' of the second fastener means 45 is clamped between two rings 45", e.g. bonded to the cheeks of a fork of the second proximal end 42" of the associated second link arm. The second assembly comprising the second spherical element 45' and the associated rings 45" then passes a fastener pin 45'''. Since the rings 45" are bonded to the forks, the second spherical element 45' is not in a position to move in translation along an assembly axis AX' along which the fastener pin 45''' extends.

In addition, each first secondary ball joint 36, 46 may comprise a spherical element 36', 46' located in an outer cage secured to a support rod 34, 44. This spherical element 36', 46' is clamped between two rings 36", 46" e.g. bonded to the periphery of a hole in the corresponding fastener arm 31, 41 between the first distal end 31', 41' and the first proximal end 31", 41" of said fastener arm 31, 41. The assembly comprising the spherical element 36', 46' and the associated rings 36", 46" then passes a fastener pin 36''', 46'''.

Similarly, each second secondary ball joint 37, 47 may comprise a spherical element located in an outer cage secured to a first support rod 34, 44. This spherical element 37', 47' is clamped between two rings 37", 47" bonded for example to the periphery of a hole in the corresponding link arm 32, 42 between the second distal end 32', 42' and the second proximal end 32", 42" of said link arm 32, 42. The assembly comprising the spherical element 37', 47' and the associated rings 37", 47" then passes a fastener pin 37''', 47'''.

In addition, at least one of the fastener means 30, 40 includes a finger 38, 48 that co-operates with a length member 23 of the beam.

Thus, the first link arm 32 may include a first finger 38 at its second distal end 32", which first finger is suitable for penetrating in a first centering orifice of a length member 23 of the beam 20. To fasten the first fastener means 30 to the first end zone 21 of the beam, the first finger 38 is inserted for example in the first centering orifice, and then screw-type means are used for securing the first link arm to the length member 23. Similarly, the second link arm 42 may include a second finger 48 at its second distal end 42", which second finger is suitable for penetrating into a second centering orifice in a length member 23 of the beam 20.

Furthermore, at least one fastener means includes additional connection means, such as a shackle type ring, e.g. referred to as a "shackle ring" for convenience.

With reference to FIG. 3, the second distal end 32" of the first link arm 32 includes a shackle ring 33 of connection means. In variants that are not shown, only the second link arm 42 includes such connection means, or each link arm includes such connection means, or indeed at least one fastener arm includes said connection means.

Finally, it is observed that the first fastener arm includes a first shoulder 39 for fastening to a carrier frame, the second fastener arm having a second shoulder 49 for this purpose.

Figure 4:
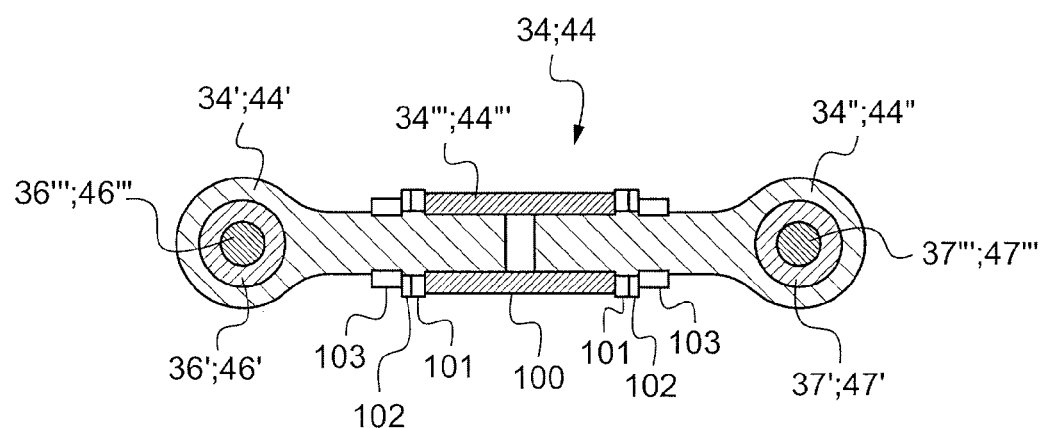
FIG. 4 is a section view of a support rod.

FIG. 4 shows a support rod 34, 44 of the invention.

This support rod is provided with first and second ball joint endpieces 34', 44' and 34", 44", each endpiece surrounding a spherical element 36''', 46''', 37''', 47''' of a ball joint in an outer cage.

In addition, the support rod includes a body into which the first and second endpieces are screwed. An assembly provided with a nut-lock 101, a washer 102, and a nut hold each endpiece in position. The support rod then extends over a length that is adjustable.

FIG. 5 is a section of a beam.

It should be observed that the beam 20 possesses a length member 23 going from its first end zone 21 to its second end zone 22. Two holes 24 are made in the length member 23 for fastening respective pieces of equipment 6 to the support. A pin 125 may pass through each of the holes 24 and through the piece of equipment 6, or at least a fastener ring 6' of the equipment, in order to optimize fastening. The length member 23 then defines each of the holes 24.

Furthermore, FIG. 5 shows the fastening of each fastener means 30, 40 by bolts 110 that co-operate in particular with the length member 23.

Furthermore, the beam 20 is partially hollow, i.e. the inside of its outer covering supported by said length member 23. Under such circumstances, electric cables may be placed inside the beam 20.

Advantageously, the beam is thus fitted with a plurality of combs 26 for guiding the cabling.

With reference to FIG. 2, the first distal end 31', 41' of the first and second fastener arms 31, 41 may be inserted in orifices in the first and second elevation uprights 8, 9. Additionally, shoulders 39, 49 of said first distal end 31', 41' are screwed to said elevation uprights 8, 9.

With reference to FIG. 6, in another embodiment, the support includes at least one reinforcing member 50.

Such reinforcement 50 comprises a framework located in an empty space of the frame, and in particular of the top portion 2", 3" of an elevation upright 8, 9 of the carrier frame 2, 3.

The reinforcement is then provided with an orifice 51 enabling the first distal end 31', 41' of a fastener arm to pass, and also with a base 52 receiving the foot of said first distal end 31', 41'.

The optional shoulder 39, 49 of the first distal end 31', 41' of a fastener arm is then fastened to the reinforcement by conventional means, e.g. by screw fastening.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A removable support for optional equipment on an aircraft, wherein said support comprises:
   an elongate beam fitted with at least one attachment point configured to support a piece of equipment during flight operations and extending from a first end portion to a second end portion, the elongate beam having a hollow beam body supported by a central length member extending from the first end portion to the second end portion;
   a first fastener means including a first fastener arm and a first link arm, the first fastener arm having a first peg at a distal end configured to removably couple with an aircraft, the first peg extending parallel with the first fastener arm, the first fastener arm further having a proximal end connected to a proximal end of the first link arm, the first link arm having a distal end releasably fastened to the first end portion of the elongate beam; and with a second fastener means including a second fastener arm and a second link arm, the second fastener arm having a second peg at a distal end configured to removably couple with an aircraft, the second peg extending parallel with the second fastener arm, the second fastener arm further having a proximal end connected to a proximal end of the second link arm, the second link arm having a distal end releasably fastened to the second end portion of the elongate beam;
   a first support rod connecting the first fastener arm to the first link arm; and
   a second support rod connecting the second fastener arm to the second link arm.

2. The support according to claim 1, wherein at least one of the fastener means includes additional attachment means.

3. The support according to claim 1, wherein the fastener arm of a fastener means is hinged to the link arm of the fastener means.

4. The support according to claim 3, wherein the fastener arm of a fastener means is hinged to the link arm of the fastener means by an assembly hinge having a bushing passing through a spherical element along an assembly axis (AX), the assembly hinge accommodating movement over a given maximum distance of the fastener arm relative to the link arm along the assembly axis (AX).

5. The support according to claim 1, wherein at least one support rod of a fastener means is hinged firstly to the fastener arm and secondly to the link arm of the fastener means.

6. The support according to claim 5, wherein the proximal end of the link arm is hinged to the proximal end of the fastener arm and the distal end of the link arm is releasably fastened to the beam, and the support rod is hinged firstly to the fastener arm between the distal end of the fastener arm and the proximal end of the fastener arm, and secondly to the link arm between the proximal end of the link arm and the distal end of the link arm that is releasably fastened to the beam.

7. The support according to claim 1, wherein at least one support rod extends over a distance that is adjustable.

8. The support according to claim 1, including at least one frame reinforcement suitable for being arranged in a carrier frame, the reinforcement co-operating with a fastener arm of fastener means.

9. The support according to claim 1, wherein at least one fastener means includes a finger inserted in the length member of the beam.

10. The support according to claim 1, wherein the attachment point comprises a hole suitable for receiving optional equipment.

11. the support according to claim 10, including a support ring that co-operates with the hole.

12. The support according to claim 10, wherein the length member defines the hole, the length member being releasably fastened to fastener means.

13. The support according to claim 1, wherein the hollow beam body contains within it cable guide combs for electrical cabling suitable for being connected to the optional equipment.

14. An aircraft provided with first and second carrier frames of a fuselage, the first carrier frame having a first orifice and the second carrier frame having a second orifice laterally aligned with and spaced from the first orifice, each carrier frame being contained in an elevation plane of the aircraft, a first elevation upright of the first carrier frame and a second elevation upright of the second carrier frame being placed outside of an opening in the fuselage leading to a medium outside the aircraft, the first elevation upright being placed on a first side of the opening and extending from a first bottom portion situated at a bottom of the opening to a first top portion situated at a top of the opening, the second elevation upright being placed on a second side of the opening and extending from a second bottom portion situated at the bottom of the opening to a second top portion situated at the top of the opening, wherein the aircraft includes a removable support comprising:
   a beam fitted with at least one attachment point for a piece of equipment and extending from a first end portion to a second end portion;
   a first fastener means provided with a first fastener arm having a distal end having a first post, the first post extending parallel with the first fastener arm and being removably connected via the first orifice to the aircraft and a proximal end connected to a proximal end of a first link arm, a distal end of the first link arm being releasably fastened to the first end portion;

a second fastener means provided with a second fastener arm having a distal end having a second post, the second post extending parallel with the second fastener arm and being removably connected via the second orifice to the aircraft and a proximal end connected to a proximal end of a second link arm, a distal end of the second link arm being releasably fastened to the second end portion;

a first support rod also connecting the first fastener arm to the first link arm; and a second support rod also connecting the second fastener arm to the second link arm;

the first fastener arm being releasably fastened to the first top portion via the first orifice and the second fastener arm being fastened to the second top portion via the second orifice so that the beam extends in register with the top of the opening.

15. A removable equipment support for an aircraft comprising:

an elongate beam having a first end, a second end, and an intermediate portion extending between the first and second ends, the intermediate portion having a first hole and a second hole spaced from the first hole, each of the first and second holes extending through the elongate beam;

a first fastener assembly including a first link arm, a first fastener arm, and a first support rod, the first fastener arm having a first peg extending from a distal end configured to releasably fasten to an exterior portion of an aircraft frame, the first peg extending parallel with the first fastener arm, and a proximal end connected to a proximal end of the first link arm, the first link arm having a distal end releasably fastened to the first end of the elongate beam, the first support rod connecting the first fastener arm to the first link arm; and a second fastener assembly including a second link arm, a second fastener arm, and a second support rod, the second fastener arm having a second peg extending from a distal end configured to releasably fasten to an exterior portion of an aircraft frame, the second peg extending parallel with the second fastener arm, and a proximal end connected to a proximal end of the second link arm, the second link arm having a distal end releasably fastened to the second end of the elongate beam, the second support rod connecting the second fastener arm to the second link arm.

16. The removable equipment support of claim 15, wherein the first fastener assembly further includes a first hinge connecting the first link arm and the first fastener arm and the second fastener assembly further includes a second hinge connecting the second link arm and the second fastener arm.

17. The removable equipment support of claim 16, wherein the first support rod is connected to the first fastener arm by a first ball joint and to the first link arm by a second ball joint, and the second support rod is connected to the second fastener arm by a third ball joint and to the second link arm by a fourth ball joint.

18. The aircraft of claim 14, wherein the at least one attachment point for a piece of equipment comprises a first hole extending through the beam and a second hole extending through the beam and spaced from the first hole.

19. The aircraft of claim 14, further comprising a winch supported by the removable support.

* * * * *